(12) United States Patent
Chou

(10) Patent No.: US 6,886,263 B2
(45) Date of Patent: May 3, 2005

(54) AUXILIARY DRAFTING INSTRUMENT COMBINATION APPLICABLE TO DIGITAL BOARD

(76) Inventor: Hsien-Chung Chou, 6th Floor, No. 3, Jian-Yi Road, Chung-Ho City, Taipei Hsien (TW)

( * ) Notice: Subject to any disclaimer, the term of this patent is extended or adjusted under 35 U.S.C. 154(b) by 186 days.

(21) Appl. No.: 10/103,876

(22) Filed: Mar. 25, 2002

(65) Prior Publication Data

US 2002/0189113 A1 Dec. 19, 2002

(30) Foreign Application Priority Data

Jun. 19, 2001 (TW) ...................................... 90210269 U

(51) Int. Cl.[7] ................................................. B43L 9/02
(52) U.S. Cl. .......................... 33/27.02; 33/471; 33/430
(58) Field of Search ............................ 33/27.02, 27.03, 33/471, 430, 27.01, 27.031, 27.032, 435, 436, 452, 465

(56) References Cited

U.S. PATENT DOCUMENTS

| | | | | |
|---|---|---|---|---|
| 288,235 A | * | 11/1883 | Hanstein | ..................... 33/27.02 |
| 595,607 A | * | 12/1897 | Coykendall | ................. 33/27.02 |
| 1,263,182 A | * | 4/1918 | Wolthauseb | ................ 33/27.02 |
| 1,331,415 A | * | 2/1920 | Civitts | ........................... 33/471 |
| 2,054,420 A | * | 9/1936 | Hochman | ................... 33/27.01 |
| 2,663,936 A | * | 12/1953 | Lepkowski | ................. 33/27.02 |
| 3,371,420 A | * | 3/1968 | Di Pane, Jr. | ................... 33/562 |
| 3,934,343 A | * | 1/1976 | Witecki | ....................... 33/27.02 |
| 4,451,895 A | * | 5/1984 | Sliwkowski | ................. 345/863 |
| 5,268,844 A | * | 12/1993 | Carver et al. | ................ 701/200 |

* cited by examiner

*Primary Examiner*—Christopher W. Fulton
(74) *Attorney, Agent, or Firm*—Rosenberg, Klein & Lee

(57) ABSTRACT

Auxiliary drafting instrument combination applicable to digital board, including a base seat formed with at least one pivot hole; a compass having a pivot seat for pivotally connecting two legs, a bottom end of one of the legs being snugly pivotally fitted in the pivot hole of the base seat, the other leg being connected with an electronic pen; and a subsidiary ruler one end of which is pivotally connectable on the base seat. By means of the combination of the base seat and the compass, a circle can be input on the digital board or by means of the combination of the base seat and the subsidiary ruler, an oblique line can be input on the digital board.

1 Claim, 6 Drawing Sheets

AUXILIARY DRAFTING INSTRUMENT COMBINATION APPLICABLE TO DIGITAL BOARD

BACKGROUND OF THE INVENTION

1. Field of the Invention

The present invention is related to an auxiliary drafting instrument combination applicable to a digital board, and more particularly to an instrument combination which enables a user to directly input a circle or an oblique line on a digital board.

2. Description of the Prior Art

In computer drafting software, a digital board serves as an input tool. The digital board is provided with function keys for enhancing convenience in drafting. However, it is always desired to use an electronic pen to directly draft a necessary track on the digital board, such as a circle, an arch, an oblique line, etc. without selectively touching the function keys for input. The existent digital board lacks specific auxiliary drafting instrument. Therefore, in the case that a draft man needs to draft a circle, he/she must first selectively touch the function key on the digital board for drafting a circle and then input the coordinates of the center and radius of the circle to complete the input of the circle. This increases operation steps and prolongs the drafting time. Therefore, it is necessary to provide an auxiliary drafting instrument specifically for a digital board to enhance the drafting efficiency.

SUMMARY OF THE INVENTION

It is therefore a primary object of the present invention to provide an auxiliary drafting instrument combination applicable to digital board, including a base seat formed with at least one pivot hole; a compass having a pivot seat for pivotally connecting two legs, a bottom end of one of the legs being snugly pivotally fitted in the pivot hole of the base seat, the other leg being connected with an electronic pen; and a subsidiary ruler one end of which is pivotally connectable on the base seat. By means of the combination of the base seat and the compass, a circle can be input on the digital board or by means of the combination of the base seat and the subsidiary ruler, an oblique line can be input on the digital board. Accordingly, the auxiliary drafting instrument combination enables a user to conveniently directly draft a track on the digital board.

The present invention can be best understood through the following description and accompanying drawings wherein:

DETAILED DESCRIPTION OF THE PREFERRED EMBODIMENTS

Figure 1:
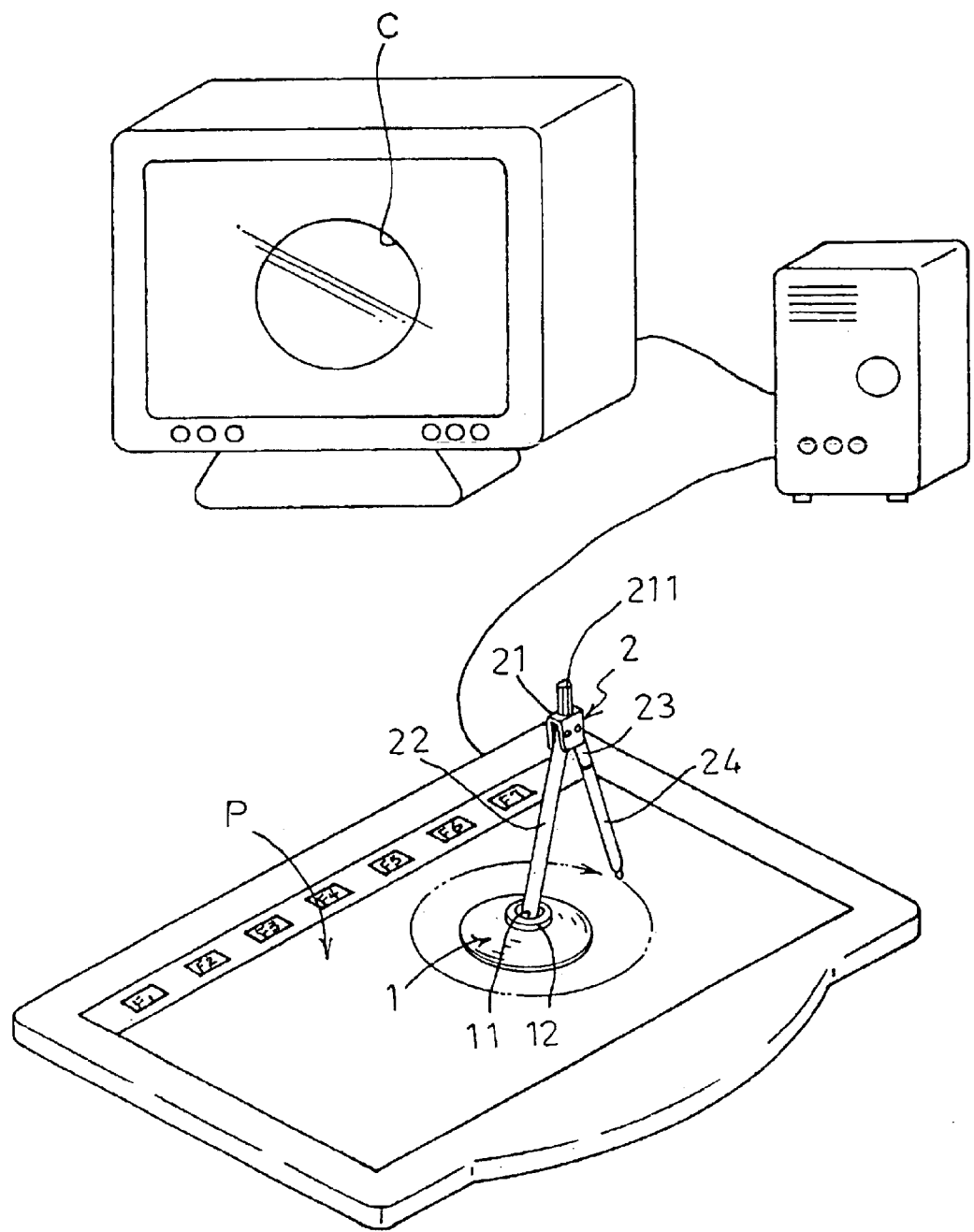
FIG. 1 is a perspective view showing that the auxiliary drafting instrument combination of the present invention is applied to a digital board, in which the auxiliary drafting instrument combination has a form of a compass.

Please refer to FIGS. 1 to 7. The auxiliary drafting instrument combination applicable to digital board of the present invention includes: a base seat 1 stably laid on the digital board P, the base seat 1 being formed with at least one pivot hole 11; a compass 2 having a pivot seat 21 for pivotally connecting two legs 22, 23, a bottom end of one leg 22 being snugly pivotally fitted in the pivot hole 11 of the base seat 1, the other leg 23 being connected with an electronic pen 24; and a subsidiary ruler 3 one end of which can be pivotally connected on the base seat 1. By means of the combination of base seat 1 and the compass 2, a user can input a circle on the digital board P. By means of the combination of the base seat 1 and the subsidiary ruler 3, a user can input an oblique line on the digital board P.

Figure 2:
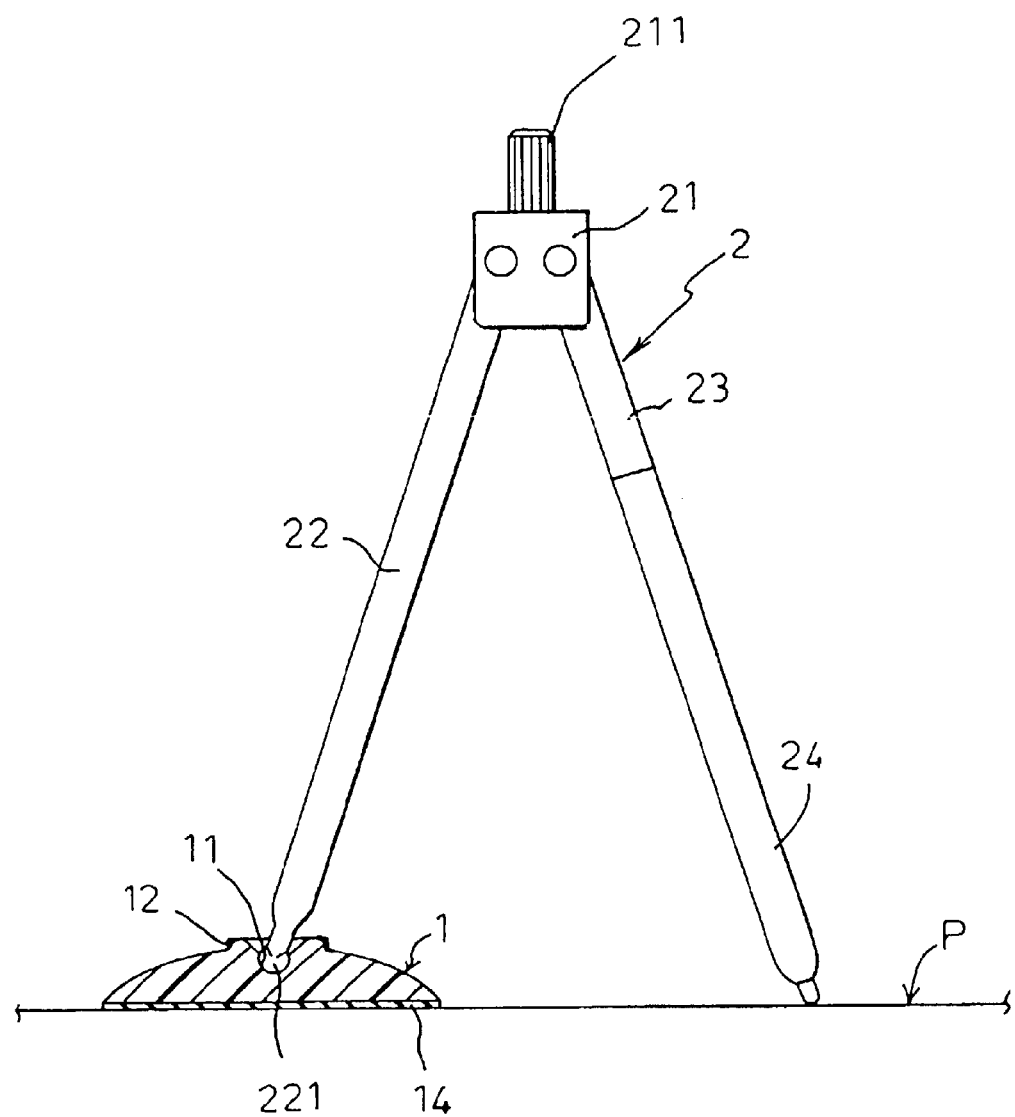
FIG. 2 is a plane partially sectional view according to FIG. 1.

Referring to FIG. 2, a slipproof pad 14 is disposed under the bottom face of the base seat 1, whereby the base seat 1 can be stably laid on the digital board P without slippage.

As shown in FIG. 2, a handle 211 is connected with top end of the pivot seat 21 for a user to hold and turn the compass 2. The bottom end of the leg 22 is formed with a pivot ball 221 for snugly fitting into the pivot hole 11 of the base seat 1.

Figure 3:
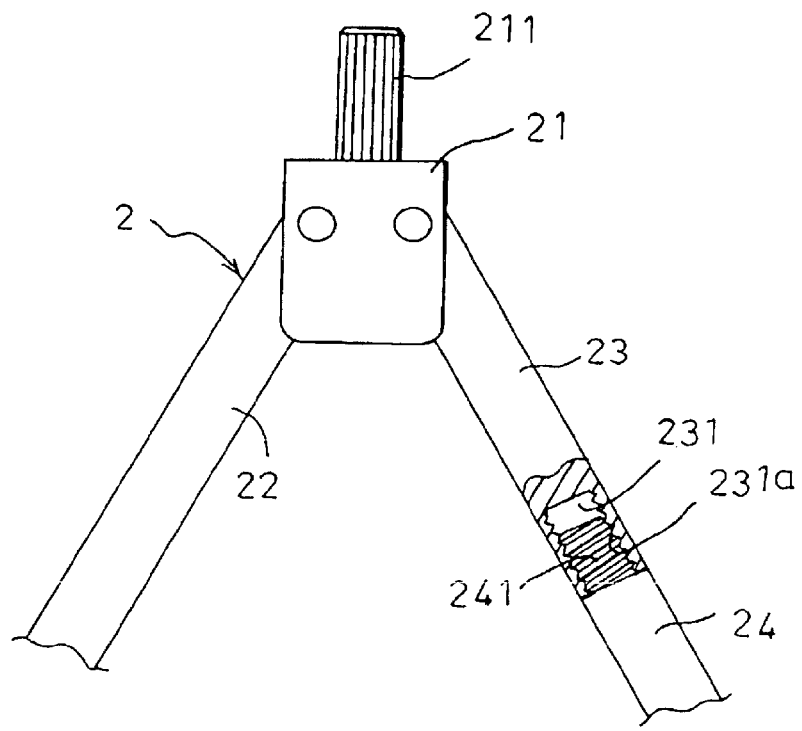
FIG. 3 is a plane partially sectional view showing a measure for connecting an electronic pen with a leg of the compass of the present invention.
Figure 4:
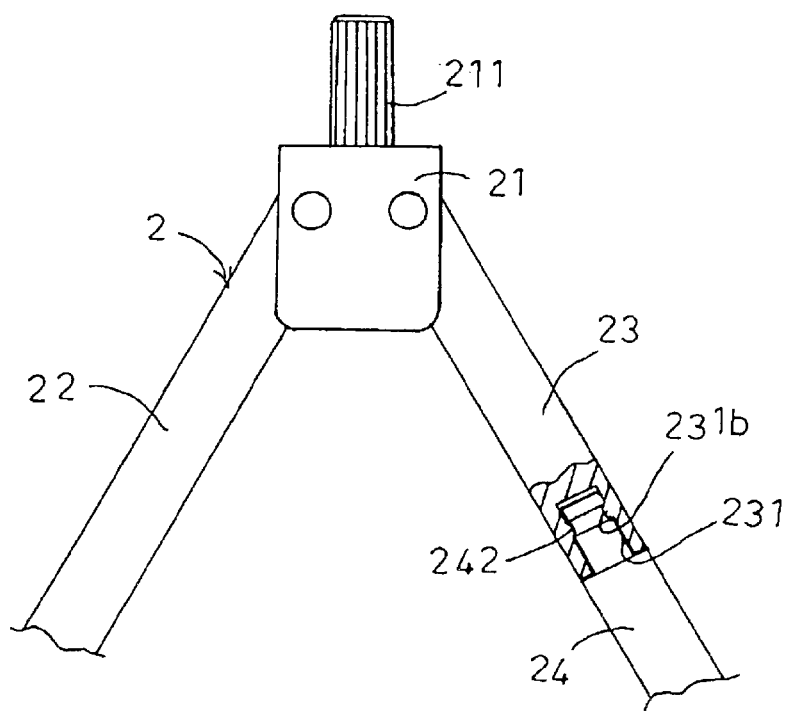
FIG. 4 is a plane partially sectional view showing another measure for connecting an electronic pen with a leg of the compass of the present invention.

Referring to FIG. 3, the bottom of the leg 23 of the compass 2 is formed with a socket 231 in which a thread hole 231a is formed. The top end of the electronic pen 24 is formed with a thread rod section 241 which is screwed into the thread hole 231a to firmly electric the electronic pen 24 with the leg 23.

Alternatively, the bottom of the leg 23 can be formed with a socket 231 in which at least one annular rib section 231b is formed. The top end of the electronic pen 24 is formed with an annular groove 242 for engaging with the annular rib section 231b to firmly connect the electronic pen 24 with the leg 23.

Figure 5:
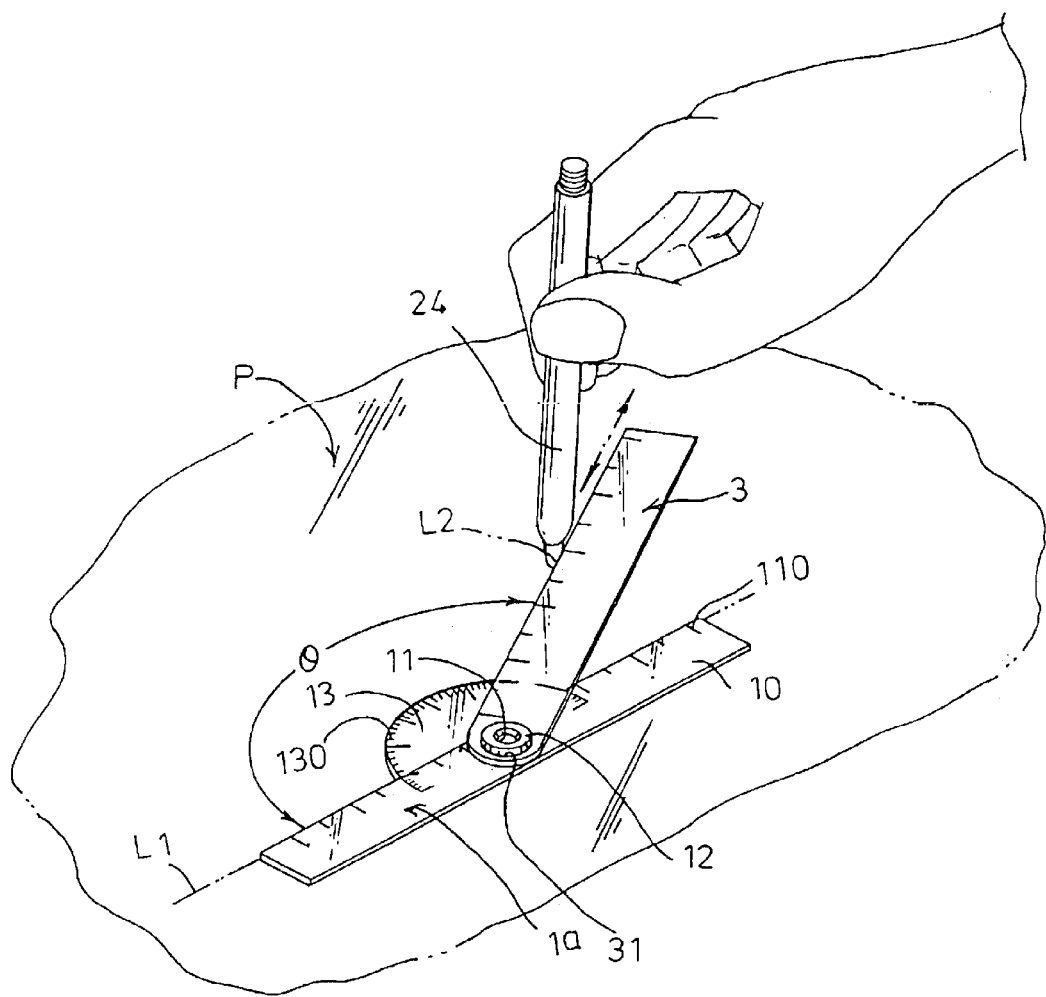
FIG. 5 shows another embodiment of the present invention.
Figure 6:
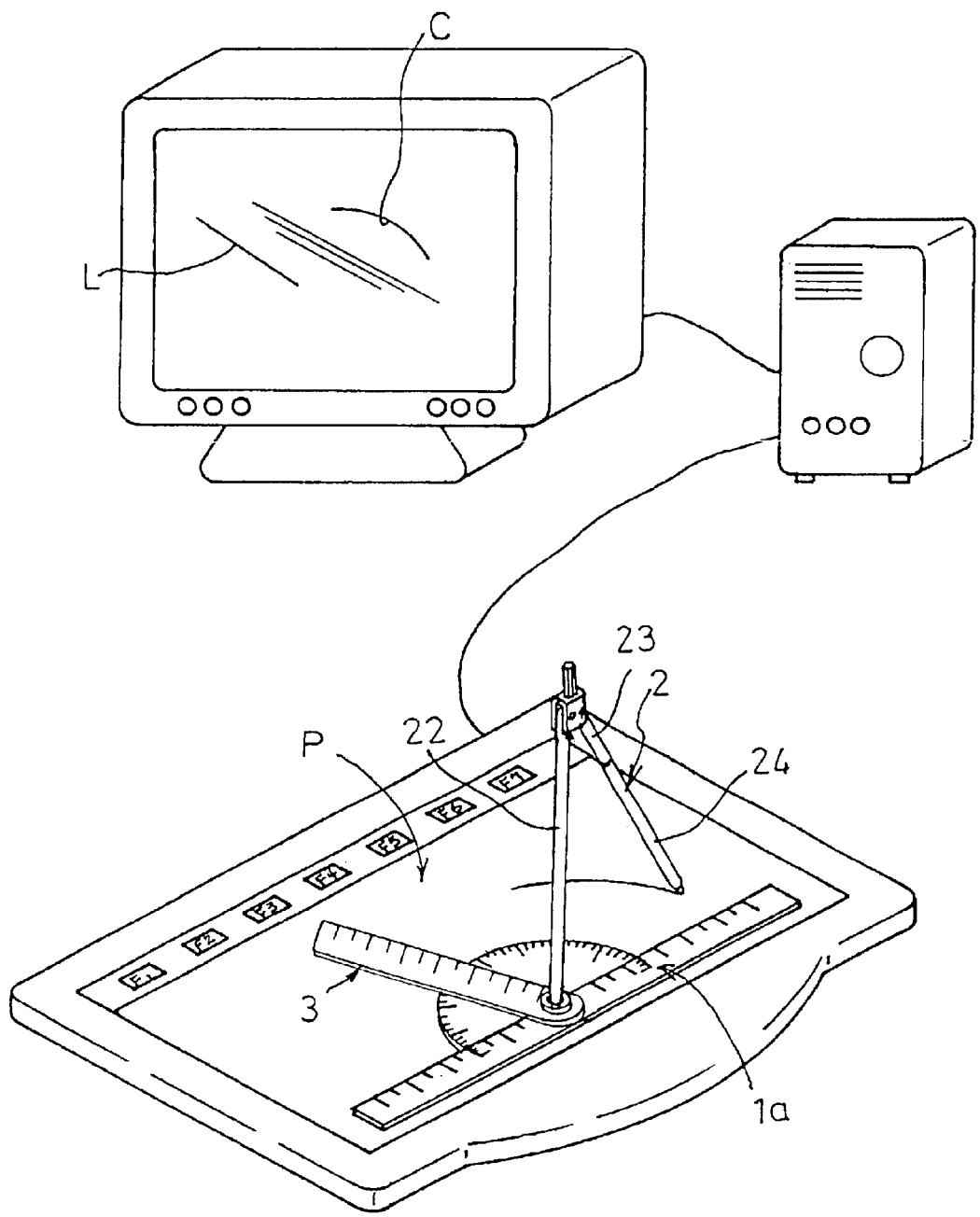
FIG. 6 shows that the compass is pivotally mounted on the base seat of FIG. 5.

FIG. 5 shows another embodiment of the present invention, in which the base seat 1a has an elongated slat 10. At least one lateral edge of the slat 10 is marked with scales 110. A pivot seat 12 is disposed on the slat 10 for the subsidiary ruler 3 to snugly fit thereon. The subsidiary ruler 3 can be rotated about the pivot seat 12 of the base seat 1a, whereby on the digital board P, a user can input an oblique line L2. The oblique line L2 and an phantom standard line L1 contain an angle θ. As shown in FIG. 6, the pivot seat 12 is formed with a pivot hole 11 for pivotally connecting with the bottom end of the leg 22 of the compass 2, whereby the compass 2 can be rotated about the pivot hole 11.

As shown in FIG. 5, the base seat 1a has a semicircular tray 13 formed on a lateral edge of the slat 10 about the center of the pivot seat 12. The circumference of the semicircular tray 13 is marked with scales 130 at equal angular intervals. A user can adjust and turn the subsidiary ruler 3 according to the scales 130.

Figure 7:
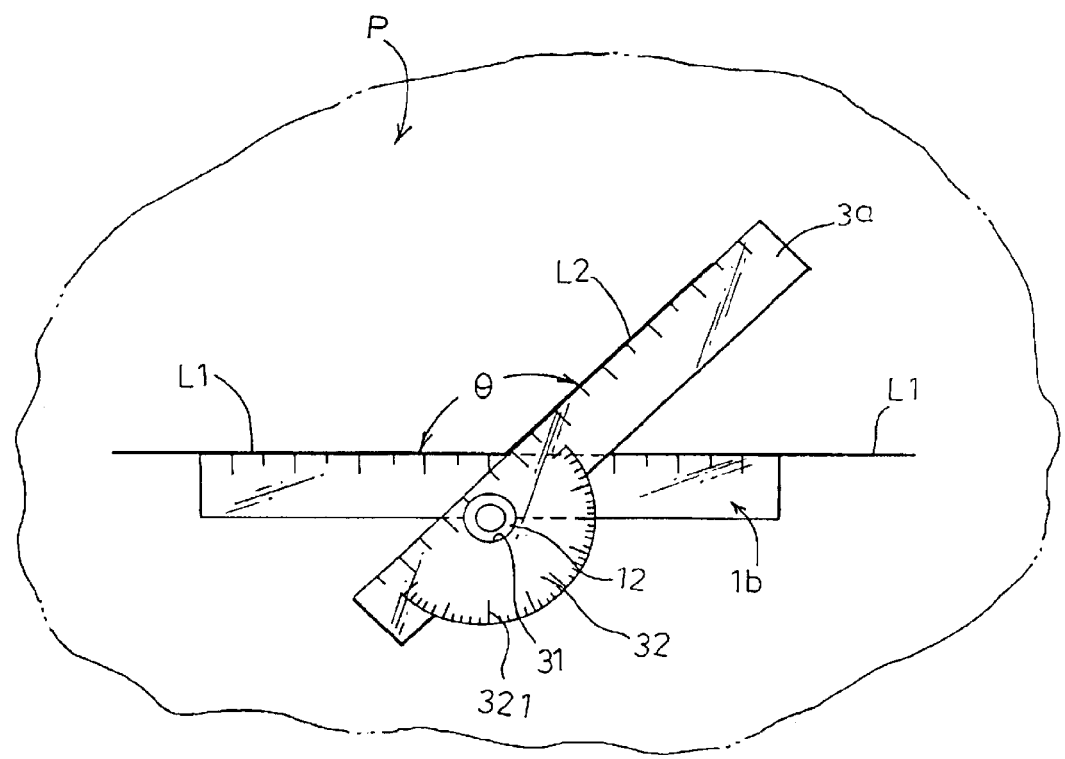
FIG. 7 shows still another embodiment of the present invention.

FIG. 7 shows still another embodiment of the present invention, in which one end of the subsidiary ruler 3a is formed with a fitting hole 31 for pivotally mounting the subsidiary ruler 3a on the pivot seat 12 of the base seat 1b. A semicircular tray 32 is formed on a lateral edge of the subsidiary ruler 3a about the fitting hole 31. The circumference of the semicircular tray 32 is marked with scales 321 at equal angular intervals. On the digital board P, a user can input an oblique line L2. The oblique line L2 and an phantom standard line L1 contain an angle θ. In this embodiment, the base seat 1b is an elongated bar or slat 10 free from the semicircular tray 13.

In application, when it is desired to input a circle on the digital board, a base seat 1 or 1a or 1b is laid on the digital board P. An electronic pen 24 is connected with the leg 23 of the compass 2. The bottom of the other leg 22 of the compass 3 is pivotally fitted into the pivot hole 11 of the base seat 1 or 1a or 1b. Accordingly, the user can turn the compass 2 about the pivot hole 11 of the base seat to drive the electronic pen 24 to draft a track of a circle on the digital board P. At this time, a circle or an arch C is immediately shown on the computer panel. When it is desired to input an oblique line on the digital board P, as shown in FIGS. 5 and 6 or FIG. 7, the subsidiary ruler 3 or 3a is pivotally fitted onto the base seat 1a and turned by a true angle. Accordingly, the user can use the electronic pen 24 to draft a track L2 of an oblique line along the edge of the subsidiary ruler 3 or 3a. At this time, an oblique line L is immediately shown on the computer panel.

The auxiliary drafting instrument combination applicable to digital board of the present invention has the following advantages:

1. The auxiliary drafting instrument combination has simple structure and can be easily and quickly assembled.

2. The auxiliary drafting instrument combination enables a user to directly input a circle or an oblique line on the digital board P.

3. The auxiliary drafting instrument combination is easy to operate and use.

The above embodiments are only used to illustrate the present invention, not intended to limit the scope thereof. Many modifications of the above embodiments can be made without departing from the spirit of the present invention. For example, the compass 2 can be such modified that the electronic pen 24 is integrally connected with the leg 23, that is, the pivot seat 21 of the compass 2 is pivotally connected with the leg 22 and the electronic pen 24.

What is claimed is:

1. An auxiliary drafting instrument combination applicable to digital board, comprising:

(a) a base seat disposed on a digital board and being formed with at least one pivot hole;

(b) a compass having a pivot seat for pivotally connecting two legs; a bottom end of one of the legs being snugly pivotally fitted in the pivot hole of the base seat, the other leg having a socket formed on a distal end thereof, the socket having an annular rib formed therein, a handle being connected with a top end of the pivot seat;

(c) an electronic pen having an end insertable into the socket, the insertable end having an annular groove formed therein for releasably receiving the annular rib therein; and, (d) a subsidiary ruler having one end pivotally connected on the base seat, whereby by means of the combination of the base seat and the compass, a circle can be input on the digital board and by means of the combination of the base seat and the subsidiary ruler, an oblique line can be input on the digital board.

* * * * *